UNITED STATES PATENT OFFICE.

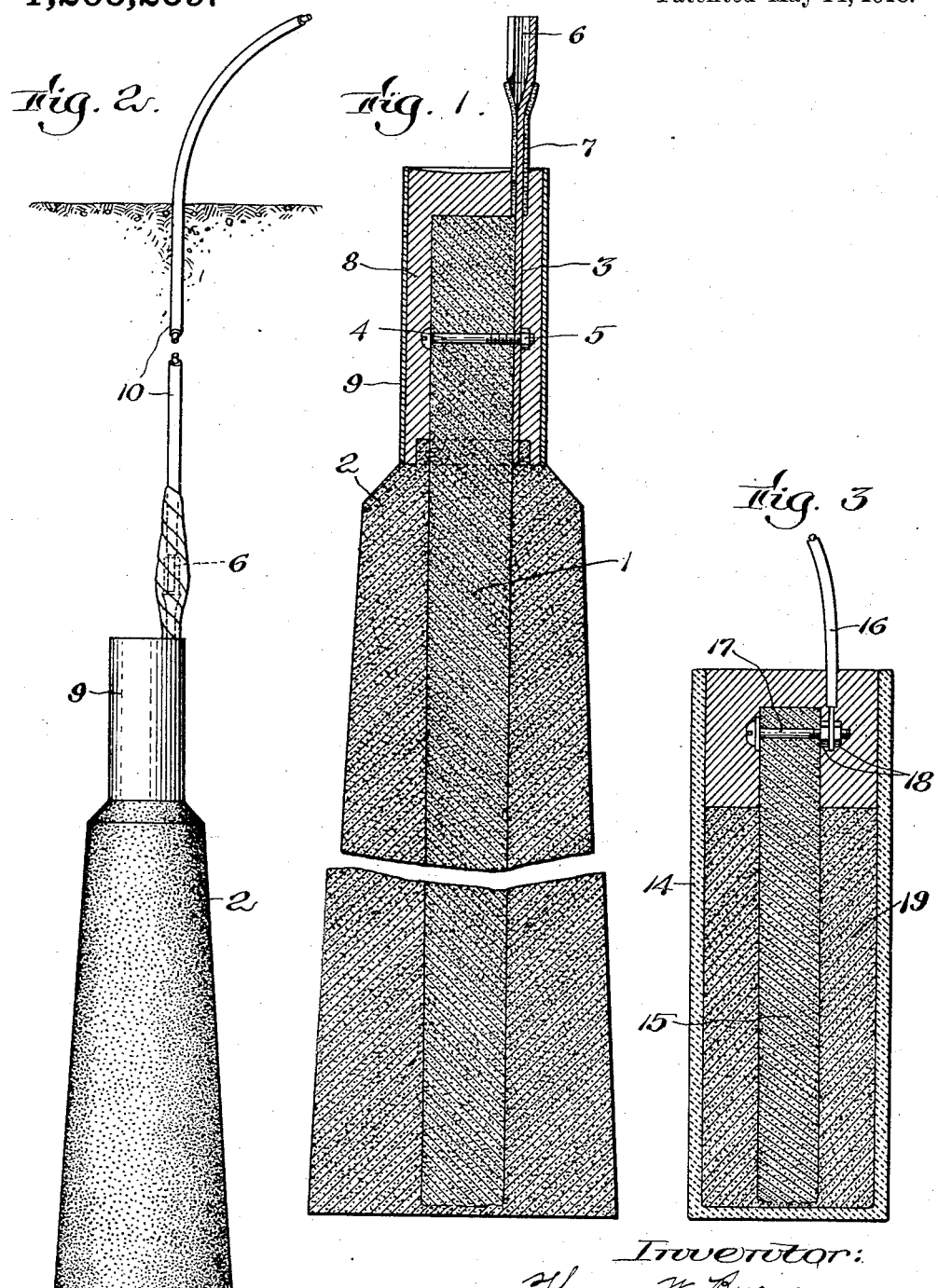

THOMAS WILLIAM BYRNE, OF BOSTON, MASSACHUSETTS.

ELECTRICAL GROUND.

1,266,209.  Specification of Letters Patent.  Patented May 14, 1918.

Application filed March 15, 1917. Serial No. 155,098.

*To all whom it may concern:*

Be it known that I, THOMAS W. BYRNE, a citizen of the United States, residing at Boston, in the county of Suffolk and State of Massachusetts, have invented certain new and useful Improvements in Electrical Ground; and I do hereby declare the following to be a full, clear, and exact description of the invention, such as will enable others skilled in the art to which it appertains to make and use the same.

The present invention relates to an electrical ground for use in connection with electrical circuits and apparatus.

In grounding circuits or apparatus it is a common practice, at the present time, to drive an iron bar or pipe into the earth to a sufficient depth to reach moisture and then to connect the bar or pipe with the apparatus or circuit. Such a device is unsatisfactory for a number of reasons, chief among which are the necessity of forcing the bar or pipe to a considerable depth in order to insure contact with moisture at all seasons of the year and under all conditions and the tendency of the bar or pipe to rust off in a comparatively few years.

Another form of ground in common use comprises a sheet or element of copper or other metal buried in moist earth. This form of ground, however, is objectionable because of the corrosion which in the course of time impairs, if not wholly destroys its effectiveness as an electrical ground. Where, as is commonly done, the metallic sheet or element is buried in direct contact with hygroscopic material, such as carbon or coke, which acts to attract and to retain moisture, the ground is further subjected to electrolytic action, the copper or other metal and the carbon or coke in contact therewith forming the elements of a galvanic battery, the electrolyte being formed by the chemical salts and moisture in the earth itself.

The object of the present invention is to provide an electrical ground which shall avoid the objections to prior devices and which shall be efficient in operation, and which shall be permanent in character without deterioration or destruction by any of the ordinary physical forces or elements.

With this object in view, the present invention consists of a ground of carbon which not only is non-corrosive, but which may, if desired, be surrounded by such hygroscopic material as loose carbon or coke without the formation of a galvanic battery in the moist earth with resulting destructive electrolysis.

A further feature of the invention consists of a ground comprising in combination a metallic conductor and non-metallic conducting material of different electric potentials, so arranged that the metallic conductor and non-metallic electrode material are not at the same time in electrical contact and exposed to the moisture of the earth. The present invention also consists in certain features of construction and arrangement which will be hereinafter described and more particularly defined in the claims.

In the accompanying drawings, which illustrate what is now considered the preferred embodiment of the present invention, Figure 1 is a vertical section through the grounding element detached, and Fig. 2 shows the ground complete in use. Fig. 3 is a modification.

The grounding element shown in Fig. 1 comprises a bar or rod 1 of carbon surrounded by hygroscopic material 2 which consists of pulverized carbon or coke held together and around the carbon by a binder of suitable material. Preferably the coke and binder are molded around the carbon in frusto-conical shape as shown, so that not only will the earth be brought into intimate contact with the ground by tamping but the gases escaping from the lower surfaces of the ground will not interfere with the free escape of gases from the upper surfaces.

If desired the carbon rod may be of sufficient length to reach above the surface of the earth, the connecting wire being attached at such upper extremity. Preferably, however, the carbon is comparatively short, as illustrated in the drawings, the connecting wire extending down into the earth.

To the top of the carbon bar, which preferably is impregnated with paraffin or other suitable water repelling material, is secured a metallic connection 3 by means of the screw 4 and nut 5. The upper end of the connection is bent into split sleeve form, as at 6, to receive the end of the connecting wire which preferably is soldered thereto. That portion of the connector projecting above the end of the carbon bar and below the wire-receiving extremity is protected by some suitable water-proof material, such as electric tape 7, and the entire upper end of the carbon bar is surrounded by water-proof insulating material 8, such as asphaltum pitch, which is poured while hot into the retaining cylinder 9 of pasteboard or other suitable material which extends well above the top of the carbon bar. The grounding element is thus formed with the connector 3 and its attaching devices entirely protected from moisture except at its extremity which is left bare to receive the connecting wire which connects the element with the apparatus or circuit to be grounded.

In Fig. 2 is shown the ground complete and in use, the connecting wire 10, which is covered with a waterproof covering, being connected to terminal 6 of the connection 3, the joint being protected by successive layers of electric tape or other suitable waterproof material.

In the modification illustrated in Fig. 3, which shows the ground with connecting wire attached ready to be placed in the earth, a porous cup or container 14 is employed within which is the carbon rod 15, the hygroscopic material 19, with or without a binder, being tightly packed in the space between the carbon and the wall of the container. The walls of the porous container extend a short distance above the top of the carbon to which is attached the conducting wire 16, covered with waterproof insulation and of sufficient length in all ordinary installations to reach above the ground. Any suitable means of attachment may be employed, such as the screw 17 and nuts 18. The top of the porous container is then filled with asphaltum pitch or other waterproof material which extends above the end of the covering of the conducting wire, thus effectually protecting the wire and the metallic connection from the moisture of the earth.

Not only is my improved ground of permanent character and not subject to deterioration from corrosion or otherwise, being formed of carbon, but in the preferred form the metallic portions or elements are completely protected from moisture and the formation of a galvanic battery is thus prevented and electrolysis with consequent damage to or destruction of the ground or its connections rendered impossible.

Having thus explained the nature and object of the present invention, what is claimed is:

1. An electrical ground comprising metallic and non-metallic elements in direct mechanical contact, the metallic element being out of contact with the moisture of the earth.

2. An electrical ground comprising metallic and non-metallic elements and means for preventing said elements from being simultaneously in direct mechanical contact and in contact with the moisture of the earth.

3. An electrical ground comprising a carbon element and means including metallic connecting devices for electrically connecting said element to the apparatus to be grounded, said metallic connecting devices being insulated to prevent contact with the moisture of the earth.

4. An electrical ground comprising a carbon element a portion of which is impregnated with water repelling material, a metallic conductor attached to the impregnated portion of the carbon element, and waterproof insulating material protecting the conductor from the moisture of the earth.

5. An electrical ground comprising a carbon rod, a metallic connector secured at its lower end to the rod and covered at its middle portion with waterproof insulating material, waterproof material surrounding the lower portion of the connector and upper end of the carbon rod and extending above the lower margin of the insulating material on the middle of the connector, the upper end of the connector being adapted to have secured thereto the conductor for connecting the ground to the apparatus to be grounded.

6. An electrical ground comprising a carbon rod, a frusto-conical body of hygroscopic material mixed with a binder and surrounding and supported by the carbon rod with the upper end of the rod extending therefrom, a conductor covered with waterproof insulating material, connections between the rod and conductor, and insulating material covering the upper end of the rod and the connections between the rod and conductor.

7. An electrical ground comprising a carbon rod, a conductor, connections between the conductor and the rod, a container surrounding and extending above the upper end of the rod, and waterproof insulating material within the container covering the upper end of the rod.

8. An electrical ground comprising a carbon element, hygroscopic material surrounding the carbon element and in direct contact therewith, and metallic connecting devices for electrically connecting the carbon element with the apparatus to be grounded, said metallic connecting devices being out of contact with the moist earth.

THOMAS WILLIAM BYRNE.